(12) United States Patent
Blankenship et al.

(10) Patent No.: US 6,359,258 B1
(45) Date of Patent: Mar. 19, 2002

(54) METHOD OF DETERMINING CABLE IMPEDANCE

(75) Inventors: George D. Blankenship, Chardon; Christopher Hsu, Mentor, both of OH (US)

(73) Assignee: Lincoln Global, Inc., Monterey Park, CA (US)

( * ) Notice: Subject to any disclaimer, the term of this patent is extended or adjusted under 35 U.S.C. 154(b) by 0 days.

(21) Appl. No.: 09/784,278

(22) Filed: Feb. 16, 2001

(51) Int. Cl.⁷ .............................................. B23K 9/095
(52) U.S. Cl. .............................. 219/130.01; 219/137 PS
(58) Field of Search ........................ 219/130.01, 130.21, 219/130.31, 130.32, 130.33, 130.51, 137 PS

(56) References Cited

U.S. PATENT DOCUMENTS 5,043,557 A * 8/1991 Tabata et al. .......... 219/130.51

* cited by examiner

Primary Examiner—Clifford C. Shaw
(74) Attorney, Agent, or Firm—Vickers, Daniels & Young

(57) ABSTRACT

A method of determining the impedance, inductance, and resistance of the network connecting an electrical power supply to an electric arc welding station including an electrode and a workpiece, wherein the method comprises: shorting the electrode to the workpiece; creating at least one waveform including a first state operating the power supply at constant current of a selected value and a second state operating the power supply at a low value of current or open circuit voltage whereby the current decays from the selected value along a decay path indicative of di/dt; obtaining the average current $I_{avg}$ and average resistance $R_{avg}$ during the first state; selecting a portion of the decay path; sampling the instantaneous current for a number of times on the path during the second state to read the rate of the decay; and, using the average current and the average resistance with the rate of decay to obtain the inductance of the network.

38 Claims, 7 Drawing Sheets

METHOD OF DETERMINING CABLE IMPEDANCE

This application relates to the art of electric arc welding and more particularly to a method and system for determining the actual inductance of cables used in the welding installation.

BACKGROUND OF INVENTION

Electric arc welding involves passing a current between an electrode and a workpiece in a manner to perform a desired arc welding process. To control the current during the welding process, the controller is set up to assume a certain impedance, including inductance and resistance, of the cables connecting the power supply with the electrode and workpiece at the welding station. Consequently, it is desirable to know the cable inductance and resistance to diagnose grounding problems and to improve the set up of the welding operation. Further, the actual inductance must be known to dynamically control the current flowing during the welding operation. In the field, the inductance of the cables used in the welding operation varies drastically. Welding processes are generally intolerant to poor circuit conditions that cause changes in the inductance of the cables. Further, some highly optimized welding processes require welding impedance within a narrow range of values. Consequently, the ability to measure and report or store inductance and/or resistance of the welding circuit is a very useful tool for application engineers in the field of electric arc welding. If the resistance or inductance values are outside specific ranges for acceptable operation, an application engineer can take corrective actions to adjust the welding circuit or factory installed welding programs, that are developed assuming certain cable impedance to obtain acceptable welding performance.

If the resistance of a cable is known to be beyond a certain limit, corrective action can be taken, such as replacing the cable or replacing moving parts in the grounding circuit. In a like manner, if the actual inductance of the welding circuit is known and is found to be too low, a length of cable can be coiled to achieve the desired inductance during set up before the process is implemented. In a like manner, if the actual circuit inductance is beyond a certain value, the welding cables can be shortened or gathered together to reduce the physical area enclosed by the welding cables to lower the inductance of the cables. To perform these corrective actions, the resistance and impedance of the welding cables must be determined on a real time basis or during set up. The value of such parameters may not be the same in prior set ups even if no discernable changes have been made to the installation.

One arrangement for measuring the actual inductance of the welding operation involves the use of leads at the power supply terminals. However, such leads have certain limitations. If one of the leads is connected to the electrode side of the installation, near the arc, and the other lead is attached to the power supply work connection, the impedance of the work lead itself is measured; however, this is not the impedance of the total circuit. In a like manner, connection of one lead to the work circuit near the arc and the other lead to the power supply electrode connection, the inductance measured is the electrode lead inductance. The use of these leads can identify certain problems; however, the actual inductance and resistance of the welding operation is not obtained. These systems have become necessary as welding control technology has advanced and become quite complex. Thus, accurate high speed voltage sensing has been used for the purpose of accurately controlling the dynamic arc voltage and measuring the transient events that occur in the arc. These systems involve a method for determining impedance of the welding circuit itself. The knowledge of the welding circuit inductance is used to optimize dynamic performance for the welding power supply. Thus, it is a substantial value to know the welding circuit impedance including inductance and resistance for use by the welding engineer. Also, this information is beneficial for machine set up, maintenance, troubleshooting, and diagnostics with respect to tooling and grounding problems. Consequently, systems have been developed in an effort to measure and record the inductance and resistance of the welding circuit. To obtain the inductance, a digital processing technique is employed. This technique involves increasing the current in a ramped straight line. By measuring the sensed voltage at a first current, awaiting a time dt and then recording a second sensed voltage at a second current, the di/dt can be calculated by the digital processor by the difference in current number over the time delay in digital format. The average voltage is determined by dividing the sum of the two sensed voltage by two. In a like manner, the average current is determined by dividing the sum of the two measured currents by two. Having these determinations made by the digital processor in the second phase of the calculation technique, the circuit inductance is obtained by digitally subtracting the average voltage from the product of the average current and circuit resistance to obtain a digital number or value divided by the digital representation of di/dt. Thus, a digital representation of circuit inductance is obtained. This technique produces a circuit resistance during the first stage and a circuit inductance during the second stage. However, these two stages are done successively while the electrode is shorted against the workpiece. The accuracy of the measurements is compromised by the variations which can occur from time to time during the testing procedure with the electrode shorted. The use of the two stage measuring operation to determine resistance and inductance of the welding operation still depends upon a measuring device, such as leads and the stability of the resulting values is less than optimum.

THE INVENTION

The digital processing procedure used for determining resistance and inductance of the welding process whereby the electrode is shorted and two measuring stages are performed is merely background to the present invention; however, it is not necessary prior art to the present invention. However, such prior two stage digital processing procedure has been improved by the present invention consisting of a method for determining the inductance of the network connecting the electrical power supply to an electric arc welding station. The network is normally a cable and gun, or a pair of cables, between the power supply and the electrode contact tip and workpiece at which the welding process is implemented. In accordance with the invention, the electrode is shorted to the workpiece so that the arc voltage is zero. Then, a series of waveforms are created. Each of these waveforms includes a first state operated by the power supply at a constant current of a selected value. In practice, this value is at least 300 amperes, which is maintained for approximately 10 ms. The waveform then includes a second state wherein the power supply is operated at a low value of open circuit voltage so that the current through the shorted circuit decays from the selected value along a decay path having a curve determined by the value of the impedance of the circuit. In practice, the open circuit voltage in the second state is zero; however, it could be at a value less than about 2.0 volts. While the electrode is shorted, many of these waveforms are sampled in succession. During each of the waveforms, the first state is digitally processed to obtain the average current and the average resistance. This operation involves taking several samples of instantaneous voltage and instantaneous current. These values are converted to digital numbers. The average resistance is the summation of the arc voltage at a sampling time divided by the instantaneous current at a sampling time. The summation is then divided by the number of samples to obtain the resistance of the cable or connecting network. This digital process provides the average resistance for the network. At the same time, during the first state the sampled instantaneous current is summed and divided by the sampling number to obtain the average current for the power supply during the constant current first state of the measuring procedure.

After the first state, the waveform transitions into the second state. A time portion for the current decay path is selected. This portion starts after the current delay has been initiated by shifting the power supply to zero open circuit voltage. This can be done by shifting the power supply to zero current. Shifting to a low value is the general or broad concept. Zero output is the best to avoid noise. The current decay is concluded before the power supply is shifted back to the constant current mode. In practice, this timed portion is about 4.0 ms. During this time portion, a substantial number of instantaneous current samples are taken. Each of the samples occurs about each 0.10 ms. Since the time portion is approximately 4.0 ms, in this second sampling procedure, approximately 40 current samples are recorded. In the first state, about 10 current and voltage samples are taken over approximately 1.0 ms. Consequently, the invention involves interrogating the actual waveform approximately ten times during the constant current or first state and approximately 40 times during the zero open circuit voltage or second state. Both of these states are implemented in approximately 30 ms. Thereafter, the states are repeated and the digital process of the samples is also repeated. During the first state, the average current and average resistance is obtained very accurately due to the large number of samples during a very short period of time after the current has stabilized. In a like manner, the current decay rate during the second state is accurately measured due to the sampling process when a large number of current samples are processed. The instantaneous current is sampled during the time portion in the second state. By using the instantaneous current and the average current obtained during the first state, together with the average resistance from the first state, the instantaneous inductance is determined by digital processing of these values in the second state. Then, the microprocessor or other digital processor sums the instantaneous inductance values calculated 40 times during the second state. By dividing the resulting accumulated inductance values by the sampling number performed in the second state, the actual inductance in the connection network is obtained for use in controlling the welding process and in setting up the welding operation.

In accordance with an aspect of the invention, the time portion of the decay curve in the second state is delayed a short time until the current has decayed to a certain value. Thereafter, the 4.0 time portion allows implementation of the 40 sample measurements to obtain 40 instantaneous inductance numbers along a stable portion of the decay path.

The present invention is implemented digitally; however, the waveforms are displayed for viewing by the welding engineer. In essence, the present invention involves the creation of waveforms which may be displayed and then using these waveforms to first determine certain actual parameters of the welding operation and then using these parameters together with an analysis of the decaying current curve to determine the actual inductance of the circuit. The present invention is an improvement over a system wherein the first state is used to measure a parameter, such as resistance, and then the next state is a variable current state which drives the current in a ramped fashion to determine the inductance. Such ramping of the current is not as accurate and is not as stable as the current decay used in the present invention. Nevertheless, the invention is broad enough to include a method where the instantaneous inductance is determined in a time based second state using the average resistance with the instantaneous measurement of the current periodically along the decay curve of the second state to obtain the inductance of the network.

In accordance with the preferred embodiment of the invention, the instantaneous inductance is obtained by multiplying the negative of the average resistance obtained during the first state by the time and divide this product by the natural log function of the instantaneous current divided by the average current. This instantaneous inductance is then averaged over the sample numbers. In this manner, the digital processor employs the natural log function in combination with a large number of samples to stabilize the digital process. Consequently, an accurate reading of the total inductance of the actual circuit and the actual resistance is obtained for use in controlling the welding process or setting up the welding installation.

In the preferred embodiment of the invention described above, the time relationship during the current decay curve in the second state of the waveform is read by several samples of the instantaneous current divided by the average current during the first state whereby the natural log function of this quotient is used in reading the decay curve. It has been found that this technique produces the best stability due to the smaller standard deviation of the sample readings taken at approximately ten readings per millisecond. In accordance with another embodiment of the invention, the current decay curve is analyzed, or read, as a di/dt determination wherein the prior current sample is compared to the next sample. It has been found that this second embodiment does provide as accurate determination of the inductance of the network including a cable or cables as compared to the preferred technique; however, the sample readings over the set sampling time have been found to vary from sample to sample when consistency would be expected. Thus, these samples must be averaged to obtain a relatively accurate total system inductance. The first embodiment has been found to have a less standard deviation than the second embodiment even though the second embodiment does employ the concept of the invention wherein a waveform is created having a constant current state followed by a low voltage or zero open circuit voltage and where several samples are taken during the first state to measure average resistance and average current of the network and many samples during the second state reads the decay curve. This is the broad aspect of the invention which can be employed in either of the two embodiments set forth herein or other embodiments using this same inventive digital sampling and processing techniques.

The primary object of the present invention is the provision of a method of obtaining the precise accurate inductive reactance of the connecting network, such as a cable or cables, between the power supply and the welding station of an electric arc welding installation. This invention involves the formation of a waveform and the sampling of the waveform at precise locations to provide sampling numbers which are processed digitally to provide the desired inductance and/or resistance values.

Another object of the present invention is the provision of a method, as defined above, which method can be implemented using a standard digital processor available in electric arc welding controls by merely implementing the digital processing technique constituting the present invention.

A further object of the present invention is the provision of a method for determining the impedance of the welding cables in a welding operation by creating a series of waveforms having a first state which is constant current and the second state which is a low or zero open circuit voltage wherein each state is processed with the electrode shorted to the workpiece. In using this method, a current decay curve is created and is read to provide the inductance of the network by using the actual resistance of the network.

Still a further object of the present invention is the provision of a method, as defined above, which method provides an accurate determination of the network inductance without requiring the concept of increasing voltage and periodically reading the current to measure di/dt.

Yet another object of the present invention is the provision of a method, as defined above, which method can be implemented by many embodiments involving the reading of the decay curve in the second state of each waveform with many instantaneous current samples to provide measurement reliability.

Another object of the present invention is the provision of a method of controlling an electric arc welder utilizing the inductance determined by using the present invention and/or the resistance obtained by using the present invention to modify the closed loop feedback of the welder controller.

A further object of the invention is the provision of a method, as defined above, which method uses rapid sampling during a stable segment of a constant current mode and a stable portion of the decay curve when the power supply shifts to a zero open circuit voltage mode.

These and other objects and advantages will become apparent from the following description taken together with the accompanying drawings.

PREFERRED EMBODIMENT

Figure 1:
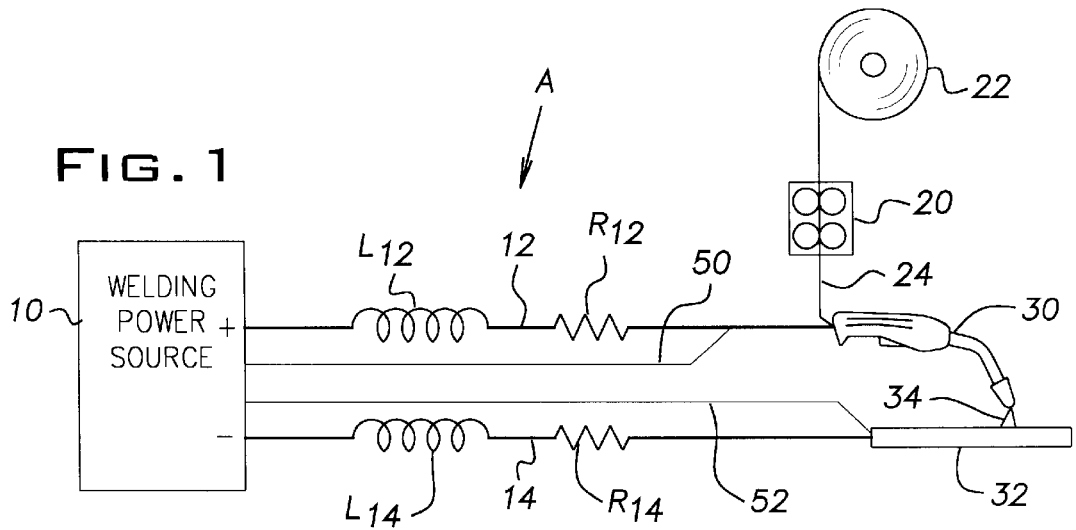
FIG. 1 is a schematic diagram of an arc welding installation for measuring the voltage for use in controlling power supply.
Figure 2:
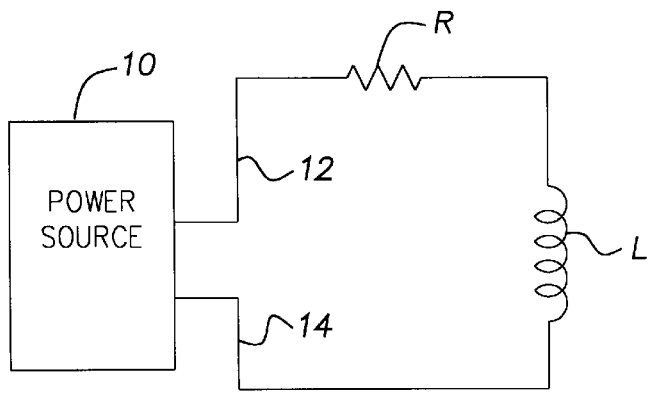
FIG. 2 is a schematic electrical diagram of the impedance in a welding operation.

Referring now to the drawings wherein the showings are for the purpose of illustrating the preferred embodiment of the invention only, and not for the purpose of limiting same, FIG. 1 schematically represents an arc welding installation A including a power supply 10 with two welding cables 12, 14 forming the connecting network between the power supply and the actual welding installation defined by a wire feeder 20 for pulling electrode or welding wire 24 from a reel 22 and passing the electrode through torch 30 toward workpiece 32. Current from power supply 10 creates a controlled arc 34 between the welding wire or electrode 24 and the workpiece to deposit the melted welding wire onto the workpiece for implementing a welding process. Heretofore, leads 50, 52 were employed for the purpose of measuring the voltage across the arc to estimate voltage during the welding cycle; therefore, the closer to the arc the better. However, the location of the leads with respect to the arc was variable and difficult to control. In some environments the lead 52 connected to workpiece 32 was located at a variable distance from the arc. The same was true of lead 50. These leads could be used to give static measurement of leads 12, 14, but the position of the lead determines the measured voltage. In practice, two leads are often used as the connecting network between the arc and the power supply; consequently, two leads 12 and 14 are shown each of which includes their own inductance $L_{12}$ and resistance $R_{12}$ and inductance $L_{14}$ and resistance $R_{14}$. In some instances, the workpiece is grounded as is the power supply; therefore, return lead 14 with its inductance $L_{14}$ and resistance $R_{14}$ is not used in the welding installation A. When changing the distance between power supply 10 and arc 34, the inductance and/or resistance of the leads vary. In addition, as the contour or path assumed by the leads is changed, the inductance $L_{12}$, $L_{14}$ can vary from installation to installation. Thus, welding installation A has no fixed impedance in the network connecting the arc with the power supply, even though this parameter formed by inductance and resistance is important in controlling the welding operation and setting up the welding installation. Leads 12, 14 have not been satisfactory in determining variations in the network impedance in a manner allowing consistent control of the welding process as the network architecture involving one or more welding cables is changed. Indeed, wear and tear of the cable and grounding fixture over a period of service time in production causes some variations in the impedance of the connecting network. Consequently, there is a need for accurately determining the impedance of the connecting network between the arc and power supply. In accordance with the invention, the arc is shorted; therefore, the representative connecting network includes an inductor L and a resistor R, as schematically illustrated in FIG. 2. Voltage is measured at the output studs thus measuring the circuit outside the power supply. The present invention involves a method of obtaining the accurate value of inductance L and resistance R prior to initiation of the welding process utilizing arc 34. By using the present invention, the actual inductance and resistance are determined for control or set up procedures.

Figure 3:
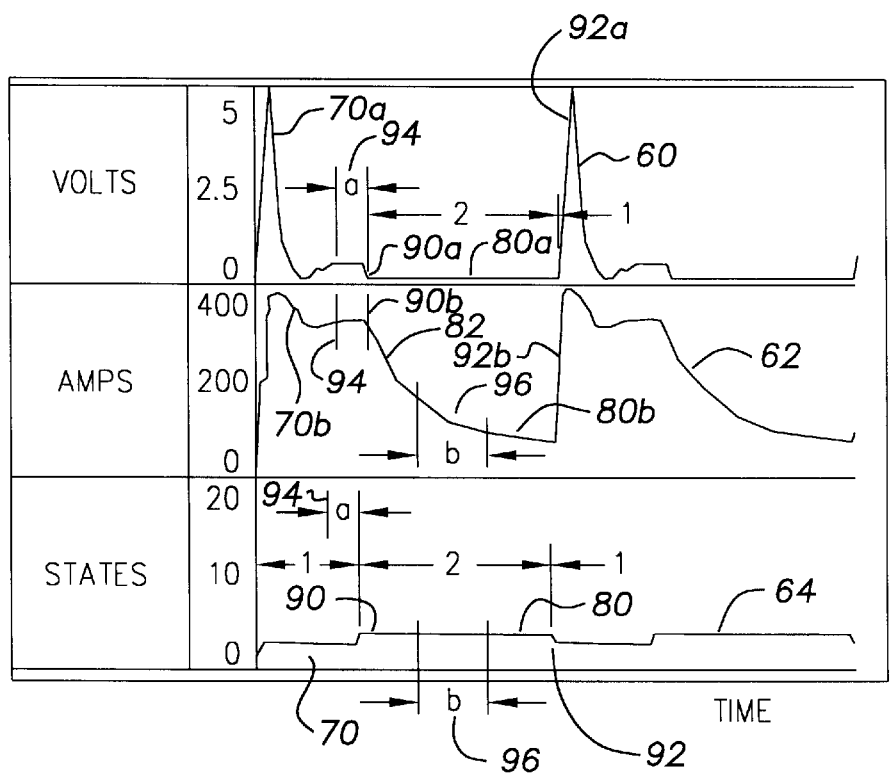
FIG. 3 is a pictorial representation of the waveforms used in the present invention and as displayed on a monitor.

The invention involves the creation of waveforms as illustrated in FIG. 3 as they are displayed on a monitor. Curve 60 constituting the voltage waveform and curve 62 is the current waveform. In practicing the invention, the waveforms shift between a first state 1 where the power supply is operated in the constant current mode and state 2 where the power supply is operated in a zero open circuit voltage mode. The state indicator is shown as graph 64 where logic 1 initiates the first state or segment 70, and logic 2 initiates the second state or segment 80. The first state or segment 70 is illustrated as segment 70a in voltage curve 60. The second state of curve 60 is segment 80a. These two segments are created in sequence by changing the power supply between constant current, which is about 300 amperes in practice, and zero open circuit voltage. In a like manner, ampere or current curve 62 has a waveform with a first segment 70b and a second segment 80b. In this curve, the current shifts from the upper value of approximately 300 amperes to a lower value along the decay curve 82 which is indicative of the inductance L of the network being analyzed. The logic on curve 64 shifts the respective voltage and current curves from the first state to the second state at time 90 to produce transition points 90a for the voltage and transition point 90b for the current. In a like manner, after second state 2 has been processed, the logic on line 64 shifts to a logic 2 at transition time 92. This produces transition points 92a for the voltage and a transition point 92b for the current. During first state 1, power supply 10 is operated at constant current. This causes the voltage to immediately spike up to increase the current toward 300 amperes. This causes an initial current overshoot as indicated in curve 62. As the constant current state stabilizes, the curves 60, 62 stabilize before stable transition points 90a, 90b. In practicing the invention, a stabilized portion of the voltage and current curve during state 1 is identified. This area 94 is a part of the voltage and current curves occurring during an approximately 1.0 ms window with a time width a, and occurring prior to the transition time 90. The digital processor identifies area 94 to constitute the first digital sampling area to allow rapid sampling of both the instantaneous current and instantaneous voltage over several samples. In practice, the samples occur each 0.10 ms, whereby approximately ten samplings occur during sample area 94. These samples are read and stored for use in calculation of the resistance and the average current for the network being analyzed.

To obtain information regarding inductance, a larger sampling area 96 is located in the second state. This larger area has a time width b of approximately 4.0 ms. This is four times the magnitude or width a of area 94 in state 1. To locate the sampling area 96 in state 2, the digital processor analyzes the current decay curve 82 during area 96. This area is started when the di/dt is less than minus 0.3 amperes/ms. As an alternative and a backup, when decay curve 82 reaches ½ the maximum current which in practice is approximately 300 amperes, sampling area 96 is initiated. During this sample area, approximately 40 samples are taken of the instantaneous current. In the preferred embodiment, only the instantaneous current data is read and stored. The sample time is not used. In the second embodiment, each sample involves both the instantaneous current and the sample time of 0.10 ms. This data provides a di/dt which may be used to start the sample area 96 as indicated before. More importantly, the data given di/dt is calculated over the 40 samples to produce a close proximation to the inductance of the connecting network being analyzed. It has been found that by taking the natural log function of the instantaneous current during a sample time divided by the average current in state 1, an accurate tracking of decay curve 82 is accomplished. The standard deviation of this latter digital process is less than the standard deviation when using the sample time to measure both the reduction in current and time to give a di/dt. Values of instantaneous di/dt has been found to fluctuate more in standard deviation than the preferred digital processing of the sampled information from decay curve 82. Irrespective of the process, information on the decay curve is combined with the resistance and average current during the constant current portion of the waveform to allow an accurate determination of the inductance of the connecting network. Other digital processing procedures and techniques could be used to process the information from sampling area 94 and sampling area 96 to produce the desired data regarding the inductance of the network connecting the power supply to the welding operation.

Figure 4:
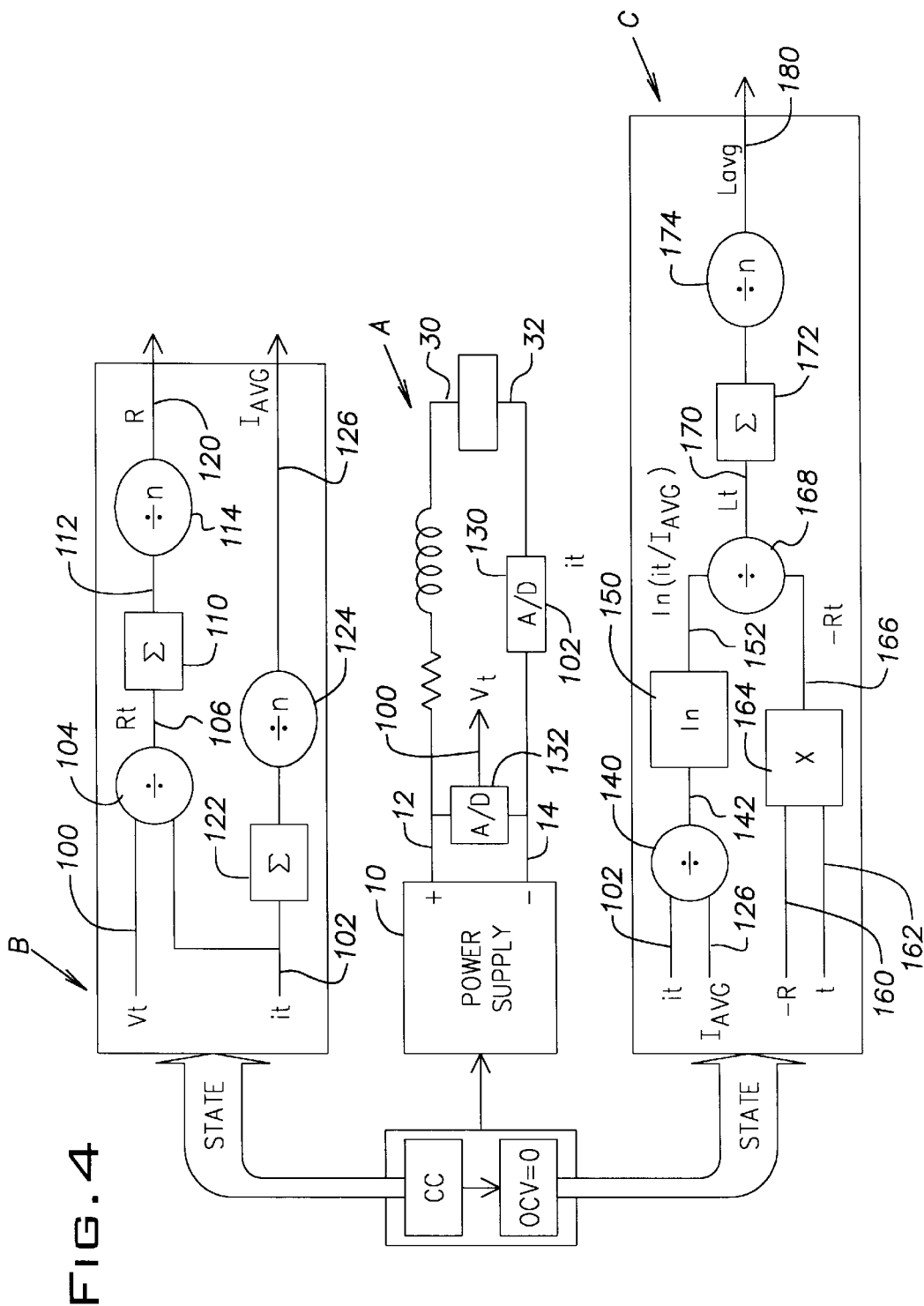
FIG. 4 is a logic diagram showing the digital processing technique employed in the preferred embodiment of the present invention.
Figure 9:
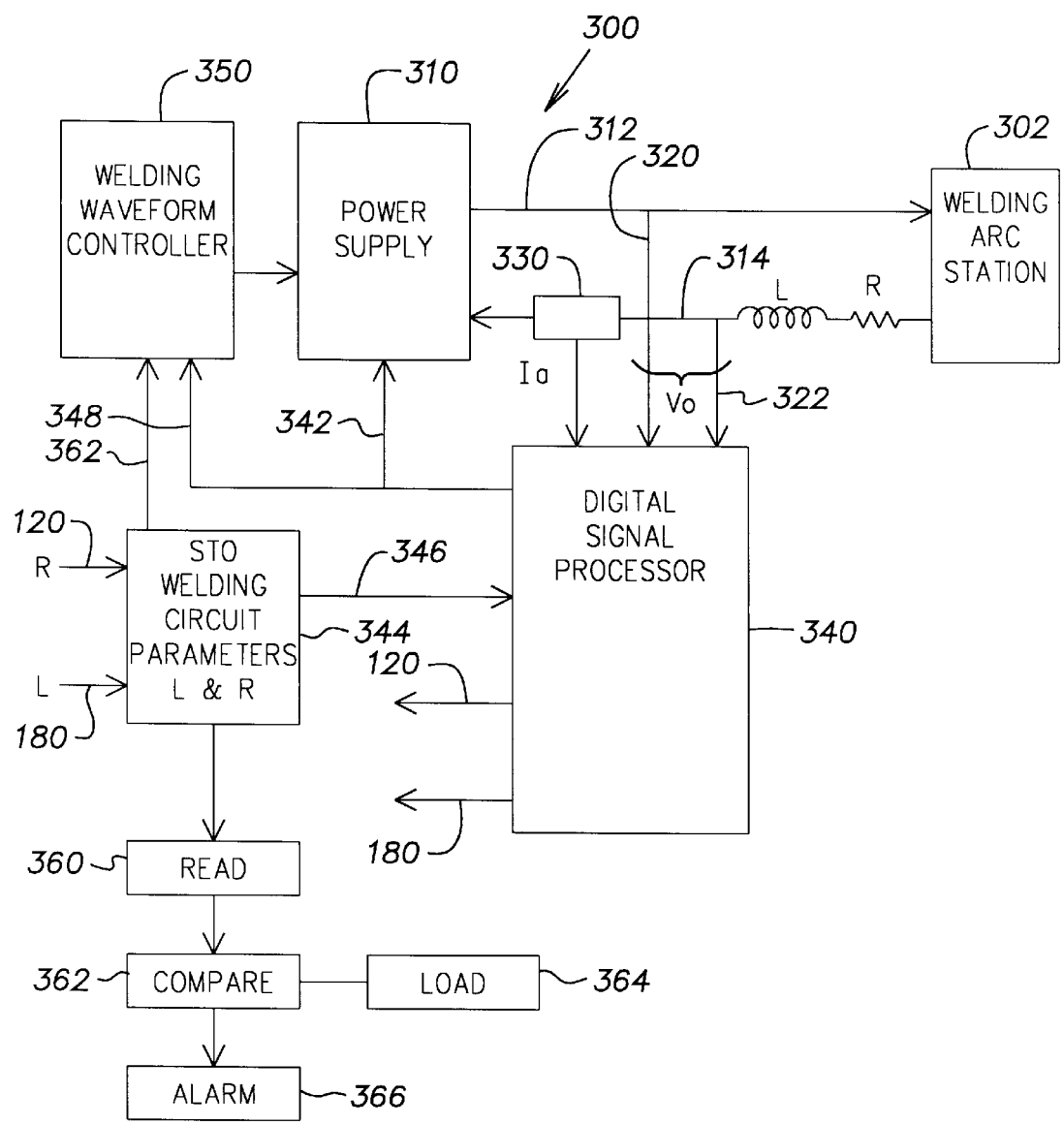

Referring now to the embodiment shown in FIGS. 4, 5, 6 and 7, the sampling data is processed in the digital processor of the welding installation as shown in FIG. 4. During state 1, power supply 10 is in the mode CC and the electrode is shorted. The instantaneous time base voltage $V_t$ is sensed and converted to a digital number represented by line 100. At the same sample, the instantaneous current $I_t$ is converted to digital information represented by line 102. These instantaneous or time base numbers are digitally divided as indicated by digital processing step 104 to provide a digital number representing the instantaneous resistance $R_t$ in line 106. The instantaneous resistances for several samples, i.e. about 10 in practice, are summed in the digital process step 110 to provide a summation number represented by line 112. This summation number is divided by n which is the number of samples taken in accordance with digital processing step 114. This produces an average resistance R for the network as determined by the sampling information during constant current state 1. This digital number is represented by line 120. While the resistance of the network is obtained through digital processing as a number at line 120, the instantaneous current represented by line 102 is summed by process step 122 and divided by sample number n as processed by step 124 to produce a number represented by line 126. This number is the average current $I_{avg}$. In FIG. 4, welding installation A is shown with the electrode 30 shorted to workpiece 32 and a shunt 130 reads the instantaneous current $i_t$ while the block 132 senses the instantaneous voltage $V_t$. These values are digitized by an A/D converter, not shown, and introduced at lines 100 and 102 to process digitally the sampled information by the process technique shown in box B at the top of FIG. 4. In a like manner, the processed information at the output of box B is used in the processing techniques shown in box C during the second stage sampling of curve 82. In this state, power supply is in the OCV=0 mode of FIG. 4. In rapid sampling of curve 82, the instantaneous current is digitized by an A/D converter, not shown, and read in line 102. The average current is the number on line 126. The number is from the digital processing occurring during the first stage sampling as represented by box B. These two digital numbers are divided by processing step 140 to provide a quotient in digital form as represented by line 142. This digital data is then processed by the natural log function subroutine 150 to provide a processed number indicative of the natural log of the instantaneous current divided by the average current. The instantaneous, i.e. time or sample based, processed number is represented by line 152. The number represented by line 120 from the digital processing taking place in box B during state 1 is converted to the negative as a number indicated by line 160. The sampling time t is a number in line 162 that is digitally multiplied as indicated by step 164 to produce a digital number indicating the negative average resistance multiplied by time as a number represented by line 166. The instantaneous numbers represented by line 152 are divided by the number represented by line 166 at digital process step 168 to produce an instantaneous inductance number represented by line 170. These instantaneous numbers in line 170 are summed, as indicated by digital processing step 172, and divided by the sampling number n as indicated by digital processing step 174 to produce a digital number representing the average inductance $L_{avg}$ at line 180. Consequently, using the digital processing network shown in FIG. 4 and the sampling techniques set forth in FIG. 3, the resistance R and inductance L of the connecting network as shown in FIG. 2 are determined accurately. These characteristics are used for setting up the welding installation to maintain these parameters within the desired range or to change the power supply for adaptation to the value of these two parameters. As shown in FIG. 9, one or more of these characteristics are used in the closed loop feedback control of welding installation A.

Figure 5:
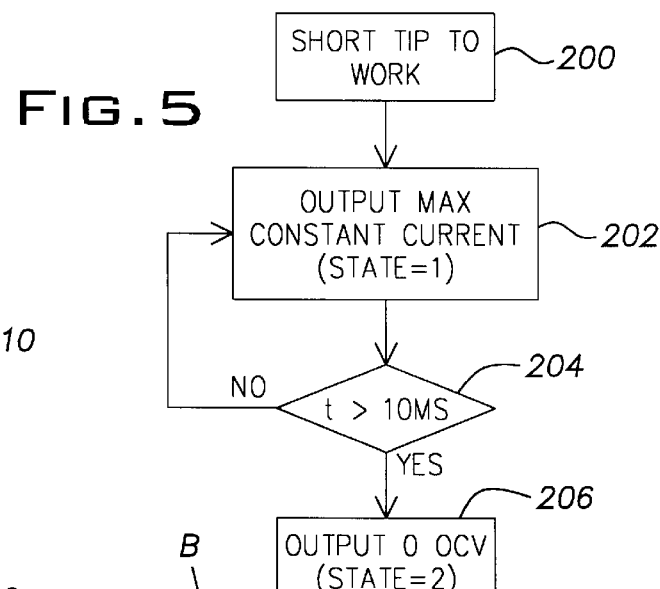
FIG. 5 is a flow chart of the digital processing steps used in creating the first and second states of the waveform used in practicing the present invention.

FIG. 5 is a flow chart of the general process discussed with respect to the waveforms shown in FIG. 3. At first, the torch is shorted to the work which is step 200. Then, state 1 is processed to maintain a constant current CC mode, which in practice, is at least 300 amperes. The constant current is preferably at the maximum current output of the power supply to increase voltage signal quality. This is shown by block 202. State 1 is maintained for ten milliseconds as illustrated by decision step 204. After ten milliseconds, transition time 90 occurs to shift from state 1 to state 2, as indicated by step 206. This transition from state 1 to state 2 and from state 2 to state 1 is repeated as shown in FIG. 3. When in state 1, the sampling area 94 is processed to produce several values for the instantaneous voltage and instantaneous current as represented by block 210 of FIG. 6. This sampling area occurs before transition from state 1 to state 2 at time 90 and represented by decision step 212. As previously discussed, sampling area 94 allows ten samples in the preferred embodiment for the determination of the average resistance and average current by digital processing of the steps or processing in box B shown in FIG. 6. During the sampling area 94 box B is implemented as indicated by a logic 1 in line 214 of FIG. 6. During this time, the voltage and current is accumulated and averaged to produce the average resistance and the average current in line 220 to the digital processing box C. After transition time 90 decay curve 82 is read to produce sampling area 96 as indicated by block 230 in FIG. 6. In the illustrated embodiment of FIG. 6 this area is located after the di/dt shifts to less than minus three amperes/ms determined by decision step 232. After this drop in the decay, the illustrated embodiment awaits a di/dt, but starts to rise as indicated by decision step 234. Decision steps 232 and 234 are designed to reject noisy samples immediately after the state transition. This initiates sample area 96 for the next 4.0 ms to produce many instantaneous current readings. The sample time is 0.10 ms to give 40 samples. Box C of FIG. 4 is again shown in FIG. 6 to produce an average inductance $L_{avg}$ for use in setting up the welding installation of FIG. 1 or interacting with the digital processor of the control circuit to modulate or trim the closed loop feedback system of the arc welder as shown in FIG. 9.

Figure 6:
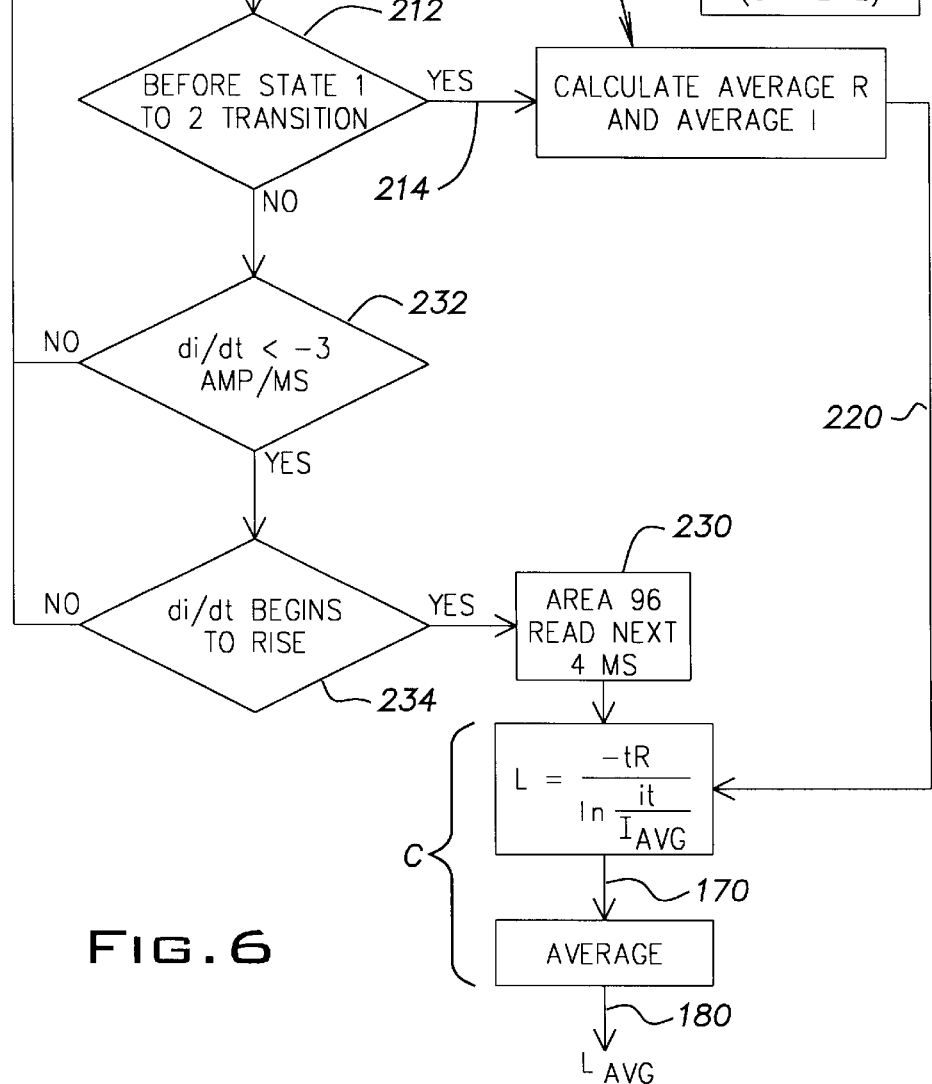
FIG. 6 is a flow chart of the digital processing steps or implementation used in practicing the preferred embodiment of the present invention as shown in FIG. 5.
Figure 7:
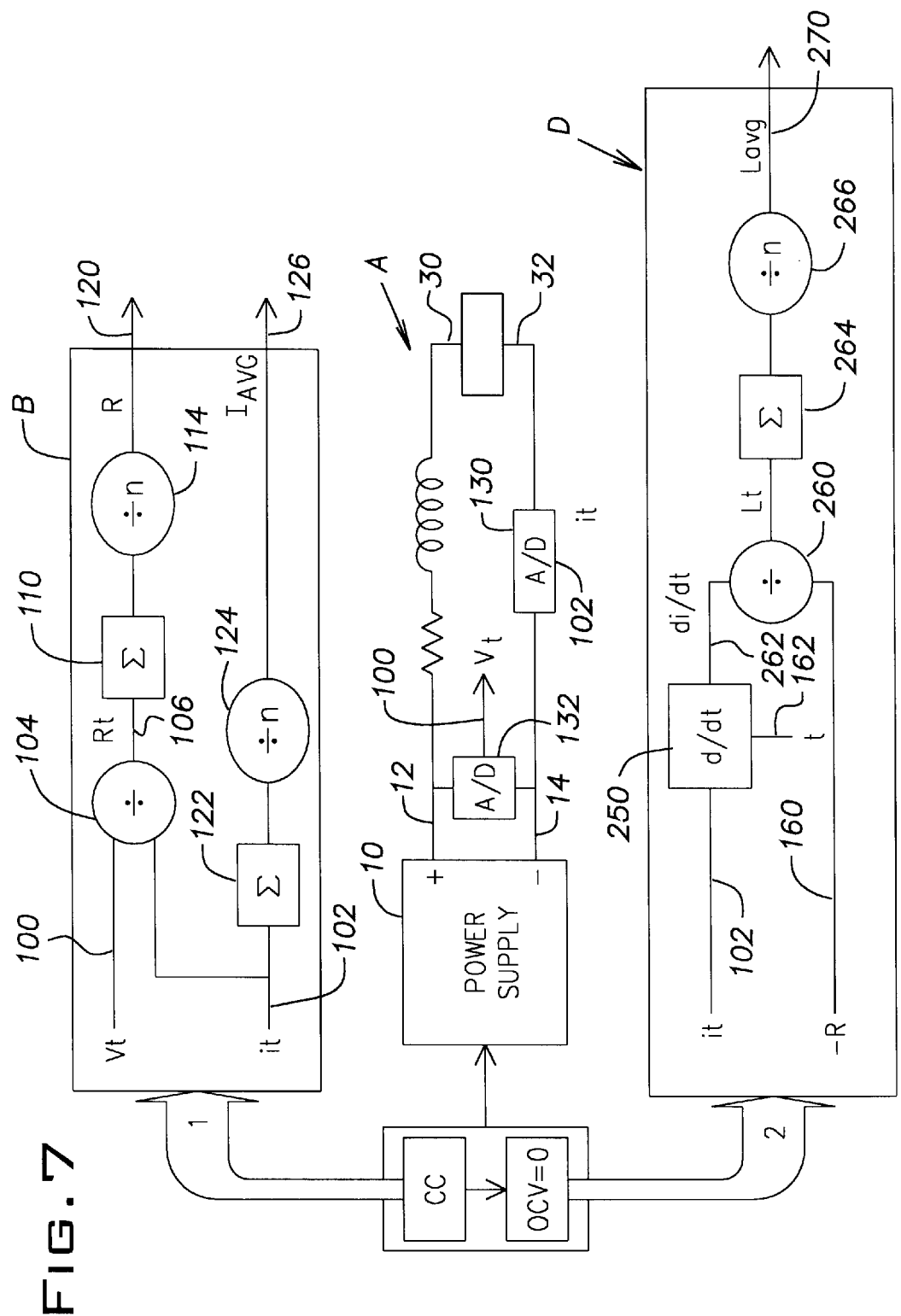
FIG. 7 is a logic diagram showing the digital processing technique employed in the second embodiment of the present invention.
Figure 8:
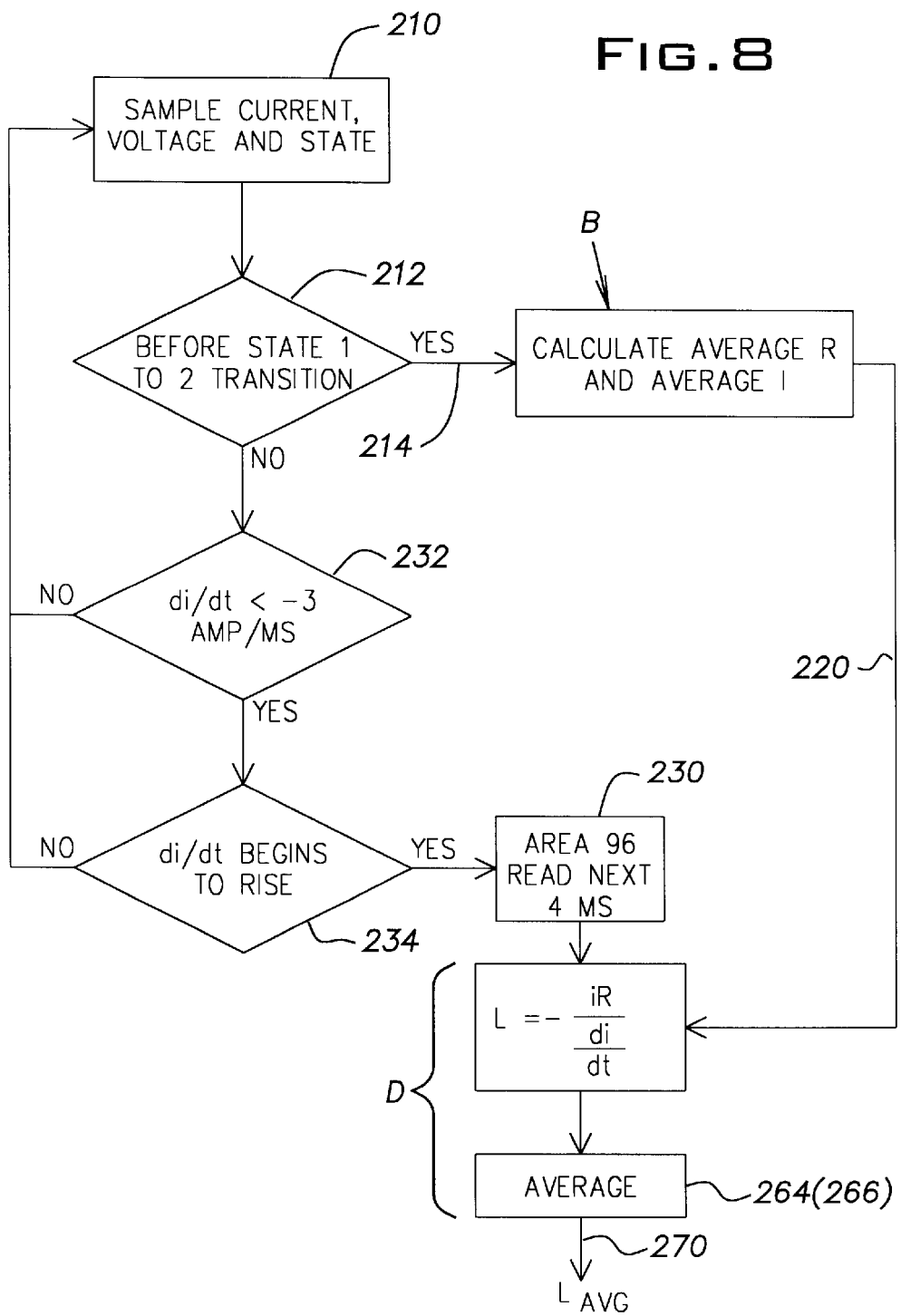
FIG. 8 is a flow chart of the digital processing steps or implementation used in practicing the embodiment of the invention as shown in FIG. 7; and, FIG. 9 is a block diagram of a standard electric arc welding installation wherein the closed loop feedback to the controller is modified and/or adjusted by the welding parameters such as inductance and/or resistance obtained when using the present invention.

As previously mentioned, processing of the information from current decay curve 82 is preferably by the digital processing steps set forth in FIG. 4 and duplicated in FIG. 6. However, another processing of the decay curve 82 is used by a second embodiment for practicing the invention as shown in FIGS. 7 and 8. Digital data and processing steps identical to the disclosure in FIG. 4 have the same numbers and need not be further described. Power supply 10 is controlled to be constant current as indicated by block CC or zero as indicated by block OCV=0. State 1 is implemented by the digital processing technique shown in box B in the same manner as described with respect to FIG. 4. Box C processing provides the average resistance represented by line 120 and the average current as represented by number 126. In the second preferred embodiment of the invention, the digital processing technique shown in box D is employed. A first input is the digital number on line 102 representing instantaneous current readings during sample area 96. The time t indicated by line 162 is used with the differential in current at successive samples on line 102 to produce a di/dt value by processing step 250. Step 250 provides a succession of di/dt numerical values represented by line 252 in box D. A digital processing divider step 260 divides the negative resistance number represented by line 160 with the instantaneous di/dt number represented by line 252. This digital process gives an instantaneous inductance measurement as a number represented by line 262. This number is summed by processing step 264 and divided by the sampling number n as indicated in processing step 266. This generates a number represented by line 270. This number is the inductance L for the network shown in FIG. 2. It has been found that the standard deviation using the digital processing technique shown in box D is somewhat greater than the standard deviation using the technique shown in box C; therefore, the box C digital process technique is preferred. FIG. 8 is a flow chart of the sampling technique and digital processing of the sampled data utilizing the second embodiment shown in FIG. 7. This flow chart is essentially the same as the flow chart in FIG. 6 except the digital processing technique in box D is substituted for the digital processing technique in box C of FIG. 6.

Referring now to FIG. 9, electric arc welder 300 directs a welding process at station 302 by a power supply 310 connected to the station by a network or cables 312, 314. These cables have an inductance L and an inductance R. The voltage from the welding operation appears across leads 320, 322 and the current is sensed by shunt 330 to direct the voltage and current to a digital signal processor. The processor is connected to the power supply by line 342 to implement the invention. Consequently, digital processing in processor 340 produces the resistance and inductance of the connecting network in lines 120, 180. These values are stored in memory 344 for direction by line 346 back to processor 340 for adjusting, i.e. at least modulating and/or trimming, the feedback from the arc voltage and arc current as directed by line 348 to the welding waveform controller 350 or the commanded waveform through line 352. Thus, the invention is used to read and store the resistance and inductance of a welding installation. This information is used by the welding engineer or automatically (dynamically) used in the feedback loop, as shown in FIG. 9 to accurately control the welding process of welding installation 300. In practice, digital signal processor 340 is a part of waveform controller 350. In a like manner, power supply 310 houses the controls of components 340 and 350. The welding engineer can use the parameters in lines 120, 180 to set up the welding installation or modify an existing installation to maintain these parameters within a certain desired range. In accordance with another feature, the measured inductance and resistance stored in memory 344 are periodically read and stored in a log 360. The log values are periodically compared with known circuit values loaded into comparator circuit 362 from load circuit 364. When such comparison deviates from a normal value for either parameter an alarm 366 is activated for corrective action.

Having thus defined the invention, the following is claimed:

1. A method of determining the inductance of the network connecting an electrical power supply to an electric arc welding station including an electrode and a workpiece, said method comprising:

(a) shorting the electrode to the workpiece;
   (b) creating at least one waveform including a first state operating said power supply at constant current of a selected value and a second state operating said power supply at a low value of current or of open circuit voltage whereby said current decays from said selected value along a decay path;
   (c) obtaining the average current $I_{avg}$ and average resistance $R_{avg}$ during said first state;
   (d) selecting a time portion t of said path;
   (e) sampling the instantaneous current $I_t$ for a number of times n during said time portion;
   (f) obtaining the instantaneous inductance Lt of said network by multiplying the negative of the average resistance $R_{avg}$ by the time t and dividing the product by the natural log function of $It/I_{avg}$.

2. The method as defined in claim 1 wherein the number n is in the range of 10–50.

3. The method as defined in claim 2 wherein the number n is about 40.

4. The method as defined in claim 2 wherein said time portion is in the range of 1–5 ms.

5. The method as defined in claim 4 wherein said time portion is delayed after shifting to said second state.

6. The method as defined in claim 2 wherein said time portion is delayed after shifting to said second state.

7. The method as defined in claim 2 for averaging said instantaneous inductance to obtain the inductance of said network.

8. The method as defined in claim 1 wherein said time portion is in the range of 1–5 ms.

9. The method as defined in claim 8 wherein said time portion is delayed after shifting to said second state.

10. The method as defined in claim 8 for averaging said instantaneous inductance to obtain the inductance of said network.

11. The method as defined in claim 1 wherein said time portion is delayed after shifting to said second state.

12. The method as defined in claim 11 for averaging said instantaneous inductance to obtain the inductance of said network.

13. The method as defined in claim 1 for averaging said instantaneous inductance to obtain the inductance of said network.

14. The method as defined in claim 1 wherein a series of said waveforms are created for averaging the resulting inductance of said network.

15. The method as defined in claim 1 including storing successive values of L and/or R for comparison with a desired value of L and/or R.

16. The method as defined in claim 1 wherein said low is zero.

17. A method of determining the inductance of the network connecting an electrical power supply to an electric arc welding station including an electrode and a workpiece, said method comprising:

(a) shorting the electrode to the workpiece;
   (b) creating at least one waveform including a first state operating said power supply at constant current of a selected value and a second state operating said power supply at a low value of current or of open circuit voltage whereby said current decays from said selected value along a decay path;
   (c) obtaining the average current $I_{avg}$ and average resistance $R_{avg}$ during said first state;
   (d) selecting a time portion t of said path;
   (e) sampling the instantaneous current $I_t$ for a number of times n during said time portion;
   (f) using the average current $I_{avg}$ and the average resistance with the instantaneous current $I_t$ to obtain the inductance of said network.

18. The method as defined in claim 17 wherein the number n is in the range of 10–50.

19. The method as defined in claim 18 wherein said time portion is in the range of 1–5 ms.

20. The method as defined in claim 17 wherein the number n is about 40.

21. The method as defined in claim 17 wherein said time portion is in the range of 1–5 ms.

22. The method as defined in claim 17 wherein said time portion is delayed after shifting to said second stage.

23. The method as defined in claim 17 wherein a series of said waveforms are created to obtain averaging of the inductance of said network.

24. The method as defined in claim 17 including storing successive values of L and/or R for comparison with a desired value of L and/or R.

25. The method as defined in claim 17 wherein said low is zero.

26. A method of controlling an electric arc welding power supply joined to an arc welding station by a network comprising:

(a) sensing arc voltage at said welding station during a welding cycle;
   (b) sensing arc current at said welding station during said welding cycle;
   (c) generating a waveform during said welding cycle by a closed loop system using at least one of said arc voltage and arc currents;
   (d) determining inductance between said power supply and arc welding station by creating at least one waveform before said welding cycle and with said welding station shorted, said waveform including a first constant current state and a second zero voltage state with several arc voltage and arc current samples taken during said first state and digitally divided to produce digitally a resistance value of said network and many samples representing the decay of said arc current taken in the second state for combination with said resistance value to produce a digital number representing the inductance value of said network; and
   (e) adjusting said closed loop system by at least one of said inductance and resistance values.

27. The method as defined in claim 26 wherein said several samples were in the range of 5–20 samples.

28. The method as defined in claim 26 wherein said many samples were in the range of 20–50 samples.

29. The method as defined in claim 26 wherein each of said waveforms has a duration of less than 50 ms.

30. The method as defined in claim 26 wherein said decay curve samples are initiated after the shift from said first state to said second state.

31. The method as defined in claim 26 wherein said several samples are taken before the shift from said first state to said second state.

32. The method as defined in claim 26 wherein a series of said waveforms are created for averaging the resulting inductance of said network.

33. The method as defined in claim 26 including storing successive values of L and/or R for comparison with a desired value of L and/or R.

34. A method of determining the inductance of the network connecting an electrical power supply to an electric arc welding station including an electrode and a workpiece, said method comprising:

(a) shorting the electrode to the workpiece;

(b) creating at least one waveform including a first state operating said power supply at constant current of a selected value and a second state operating said power supply at a low value of current or of open circuit voltage whereby said current decays from said selected value along a decay path indicative of di/dt;

(c) obtaining the average current $I_{avg}$ and the average resistance $R_{avg}$ during said first state;

(d) selecting a portion of said path;

(e) sampling the instantaneous current for a number of times on said path during said second state to read the rate of said decay; and, (f) using the average current and the average resistance with said rate of decay to obtain the inductance of said network.

35. The method as defined in claim 34 wherein said rate of decay is di/dt determined by adjacent current samples.

36. The method as defined in claim 34 wherein said rate of decay is the natural log function of the instantaneous current during each current sampling of said path divided by the average current.

37. The method as defined in claim 34 including storing successive values of L and/or R for comparison with a desired value of L and/or R.

38. The method as defined in claim 34 wherein said low is zero.

* * * * *